Feb. 14, 1933.   G. S. ROWELL   1,897,148
TRANSFER BLANKET FOR OFFSET PRINTING
Filed April 7, 1931

Inventor
George S. Rowell,
By Bates, Golrick & Teare
Attorneys

Patented Feb. 14, 1933

1,897,148

UNITED STATES PATENT OFFICE

GEORGE S. ROWELL, OF CLEVELAND, OHIO, ASSIGNOR TO MULTIGRAPH COMPANY, OF WILMINGTON, DELAWARE, A CORPORATION OF DELAWARE

TRANSFER BLANKET FOR OFFSET PRINTING

Application filed April 7, 1931. Serial No. 528,308.

In offset printing machines it is customary to employ on the transfer roller, a rubber blanket reinforced with fabric and drawn taut about the periphery of the roller by a suitable tensioning device. The result is that if excessive tension is applied by the tensioning device the stretch given to the blanket causes it to become slightly thinner, and this thinning is irregular as the rubber is likely to have more strength in some regions than others.

The primary object of my invention is to provide a blanket which may be maintained at an absolutely definite thickness, irrespective of the tension applied to the fastening devices.

Another disadvantage of the usual blanket, is that the fabric gradually deteriorates or is injured, particularly at the edges, due to the chemicals or materials used in washing or treating the blanket, and it is a further object of my invention to overcome this difficulty.

I achieve the desired result by making a blanket of a rubber coating permanently affixed to a metal backing. The metal projects beyond the ends of the rubber, and the fastening devices engage the metal only. The result is that the tightening of the fastening devices brings the blanket to a definite taut position without stretching the rubber, and the rubber maintains a permanent uniform thickness.

My invention accordingly comprises a sheet of metal having, at its ends, means for its attachment and having in its intermediate region, a sheet of rubber permanently affixed to the metal sheet.

Figure 1:
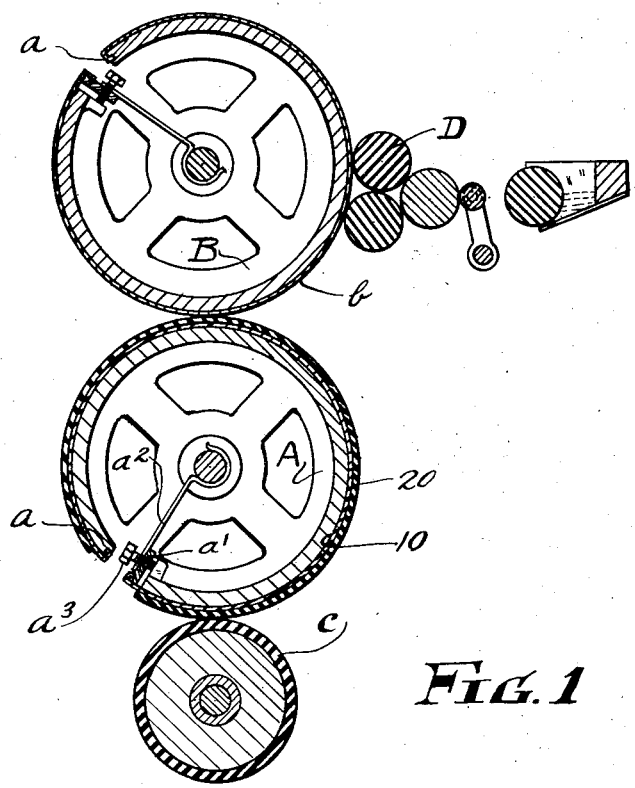
Figure 2:
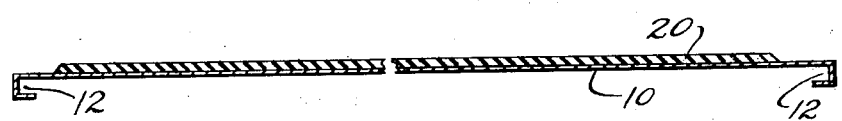
Figure 3:
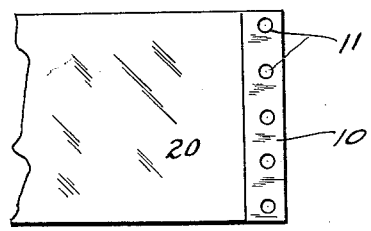

The drawing illustrates my invention, Fig. 1 being a vertical section of an offset printing machine employing my blanket; Fig. 2 being a longitudinal section of the blanket when flat having one form of attaching devices at its ends; Fig. 3 is a plan of one of the end portions of the blanket with a different fastening device from Fig. 2.

As shown in the drawing, 10 designates the metal backing of my blanket, and 20 the rubber facing. This rubber facing is permanently vulcanized to the metal. I find it satisfactory to make the metal of a zinc sheet. The rubber sheet is first calendered and then cement applied to one face thereof, and the same firmly pressed against the metal sheet and the article submitted to heat as a unit, to vulcanize the rubber in place; after which, the rubber face is slightly ground off to give the combined blanket a definite uniform thickness throughout.

The metal sheet 10 projects at its ends beyond the rubber sheet 20, and these ends provide means for attachment on the transfer roller. The projecting ends of the sheet may be simply bent and adapted to be engaged by grippers within the transfer roller, or the sheet may be provided with a row of openings, as indicated at 11 in Fig. 3, or the ends may be bent downwardly and inwardly as shown at 12 in Fig. 2, or other attaching features may be employed.

In Figure 1, A indicates the transfer roller adapted to carry the blanket in cooperation with a plate $b$ on the plate roller B, also in cooperation with the platen C. The plate $b$ may receive the ink from the inking system D, and the paper printed between the blanket and the platen C. As shown in Fig. 1, one hooked end 12 of the blanket engages a recess $a$ in one edge of the segment of the drum, and the other hooked end engages a plate $a1$ mounted on movable arms $a2$ and pressed away from the adjacent edge of the drum segment by screws $a3$. Such mechanism is intended to be illustrative of any mechanism for applying tension to the blanket.

It will be seen that my banket is easily applied to the press and readily drawn taut and by reason of the nonstretching characteristic of its base 10, will come to a definite position on the transfer roller without stretching the rubber facing 20, and accordingly, this facing will maintain its constant thickness indefinitely.

I claim:—

1. A transfer blanket for an offset printing machine, comprising a metal plate having its opposite end portions provided with means for its attachment about the transfer roller of the press and having its intermediate region impervious and covered on one side only with a rubber facing of uniform thickness vulcanized to the metal backing and terminating short of the fastening portions of the backing.

2. An offset blanket, comprising an impervious sheet metal backing exposed throughout on its under side, a yielding facing secured to an intermediate region of the upper side, the backing extending beyond the ends of the facing and formed on the exposed end with a row of openings adapted to be engaged by attaching means in the press.

In testimony whereof I hereunto affix my signature.

GEORGE S. ROWELL.